United States Patent [19]

Sayen

[11] Patent Number: 4,621,770
[45] Date of Patent: Nov. 11, 1986

[54] PLANT WATERING/MISTING DEVICE

[76] Inventor: Michael D. Sayen, 510 Emma St., Hancock, Mich. 49930

[21] Appl. No.: 568,821

[22] Filed: Jan. 6, 1984

Related U.S. Application Data

[63] Continuation of Ser. No. 330,234, Dec. 14, 1981, abandoned.

[51] Int. Cl.[4] .......................... B05B 7/26; B05B 7/02
[52] U.S. Cl. .................................. 239/304; 239/310; 239/332; 239/444; 239/526; 239/562
[58] Field of Search ............... 239/303, 304, 310, 332, 239/443–445, 526, 551, 562

[56] References Cited

U.S. PATENT DOCUMENTS

| | | |
|---|---|---|
| 506,708 | 10/1893 | Middleton . |
| 1,679,561 | 8/1928 | Cantrell .......................... 239/310 X |
| 1,715,140 | 5/1929 | Martin . |
| 1,781,045 | 11/1930 | Bacher . |
| 1,871,291 | 8/1932 | Adams et al. . |
| 1,902,548 | 3/1933 | Fenwick, Jr. . |
| 2,789,396 | 4/1957 | Jernander et al. ........................ 47/1 |
| 2,915,222 | 12/1959 | Purinton .............................. 222/175 |
| 3,262,609 | 7/1966 | Poitras .................................. 222/399 |
| 3,565,344 | 2/1971 | Takei .................................... 239/332 |
| 3,655,131 | 4/1972 | Richterkessing ..................... 239/124 |
| 3,696,973 | 10/1972 | Cottell ................................. 222/193 |
| 3,811,618 | 5/1974 | Gartner et al. ....................... 239/312 |
| 3,901,449 | 8/1975 | Bochmann ........................... 239/332 |
| 3,904,116 | 9/1975 | Jones et al. .......................... 239/127 |
| 3,971,512 | 7/1976 | Duncan ..................................... 239/1 |
| 3,993,250 | 11/1976 | Shure .................................. 239/332 |
| 4,193,518 | 3/1980 | Holmes ............................... 222/105 |

FOREIGN PATENT DOCUMENTS 691779 5/1953 United Kingdom ................ 239/444

OTHER PUBLICATIONS

Leigh Products, Inc., catalog No. 4217-U.
Jackson & Perkins Co. advertisement.

Primary Examiner—Joseph F. Peters, Jr.
Assistant Examiner—Mary Beth O. Jones
Attorney, Agent, or Firm—Price, Heneveld, Huizenga & Cooper

[57] ABSTRACT

A portable plant spraying/watering device includes a reservoir holding liquid to be dispensed, a hand-held dispensing device, and structure for delivering the liquid to the dispensing device. The dispensing device includes a housing, first and second variable flow valves fluidly connected to the liquid-delivering structure, a spray nozzle fluidly connected to the first valve, and a stream nozzle fluidly connected to the second valve, so that the liquid may be dispensed in spray or stream form selectively by opening the first or second valve, respectively.

3 Claims, 4 Drawing Figures

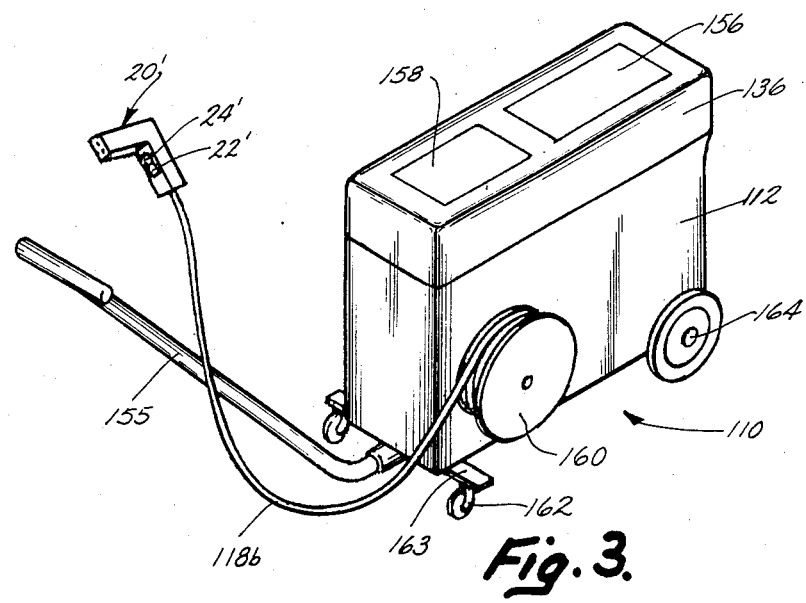
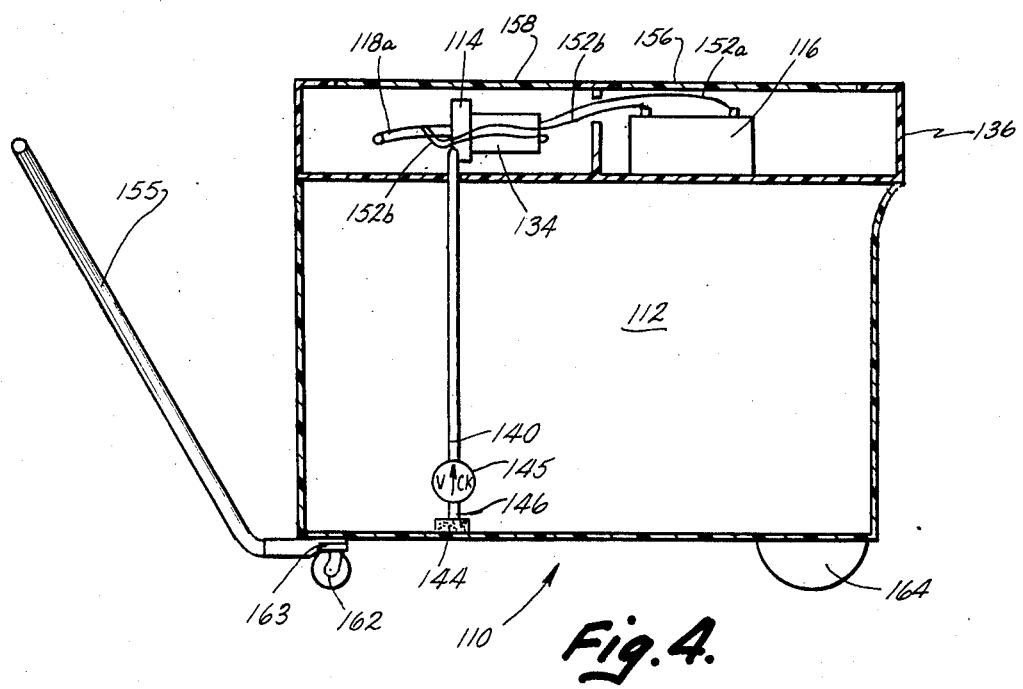

PLANT WATERING/MISTING DEVICE

This is a continuation of application Ser. No. 330,234, filed Dec. 14, 1981 now abandoned.

BACKGROUND OF THE INVENTION

The present invention relates to plant watering devices.

To properly care for house plants, it is necessary to water the potted soil and spray the plant leaves at periodic intervals to insure that the plants have an adequate supply of water. "House plants" as used herein refers to all potted plants regardless of whether they are located in a home, commercial building, or even outside. Many portable water devices have been developed in an attempt to meet plant watering needs. Most devices include a reservoir containing liquid to be dispensed onto the plants, a hand-held dispensing unit, and means for delivering the liquid in the reservoir to the hand-held unit under pressure. The hand-held unit usually includes some type of valve so that the flow of liquid to the plants can be regulated. Prior watering devices include many different means for pressurizing the liquid including hand-operated delivery pumps, pumps for pressurizing the reservoir, and battery-operated delivery pumps.

The liquid dispensed through the outlet in prior devices must either be in stream form or spray form, depending on the type of nozzle mounted on the outlet. The liquid output form may be varied somewhat by mounting an adjustable nozzle in the hand-held unit. However, such an adjustable nozzle requires the operator to manually adjust the nozzle each time he desires to switch from spray dispensing to stream dispensing and vice versa.

Another device includes a manually operated mister mounted on a conventional watering can. Water within the can may be dispensed either in a stream by tipping the can allowing the liquid to flow out of the conventional pour spout or as a mist by pumping the manually operated mister. This device is extremely difficult to use with overhead plants because the entire device must be elevated to the height of the plants in order to pour water thereonto. Further, the manually operated misting pump is tedious and impractical to operate except on a limited scale.

SUMMARY OF THE INVENTION

In the present invention, a plant watering/misting device is provided which includes a hand-held dispensing unit having independently operable spray and stream dispensing outlets. The device includes a reservoir containing liquid to be dispensed onto the plants and means for delivering the liquid from the reservoir to the hand-held unit. Consequently, liquid may be dispensed onto the plants in either spray form or stream form depending upon which of the two outlets in the hand-held unit is actuated.

In a preferred embodiment of the invention, the dispensing device includes first and second variable flow valves fluidly connected between the liquid delivering means and the spraying and stream outlets, respectively. In this embodiment, the flow of liquid through either of the outlets may be varied by varying the volume of liquid permitted to flow through the valves.

The dispensing device of the present invention permits one to both water and spray plants using a single hand-held unit which does not require nozzle adjustment to switch from watering to spraying and vice versa. Consequently, the task of house plant care is greatly facilitated by the present invention.

These and other objects, advantages, and features of the invention will be more fully understood and appreciated by reference to the written specification and appended drawings.

BRIEF DESCRIPTION OF THE DRAWINGS

FIG. 3 is a perspective view of an alternative wheeled embodiment of the device incorporating a larger reservoir; and FIG. 4 is a fragmentary, sectional view of the alternative device.

DESCRIPTION OF THE PREFERRED EMBODIMENT

Figure 1:
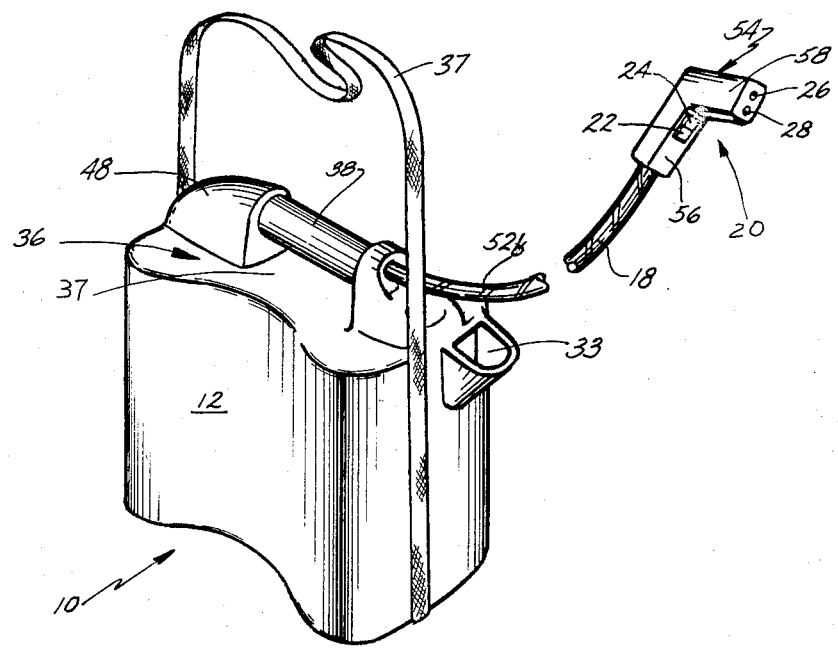
FIG. 1 is a broken, perspective view of a plant watering/misting device constructed in accordance with the present invention.
Figure 2:
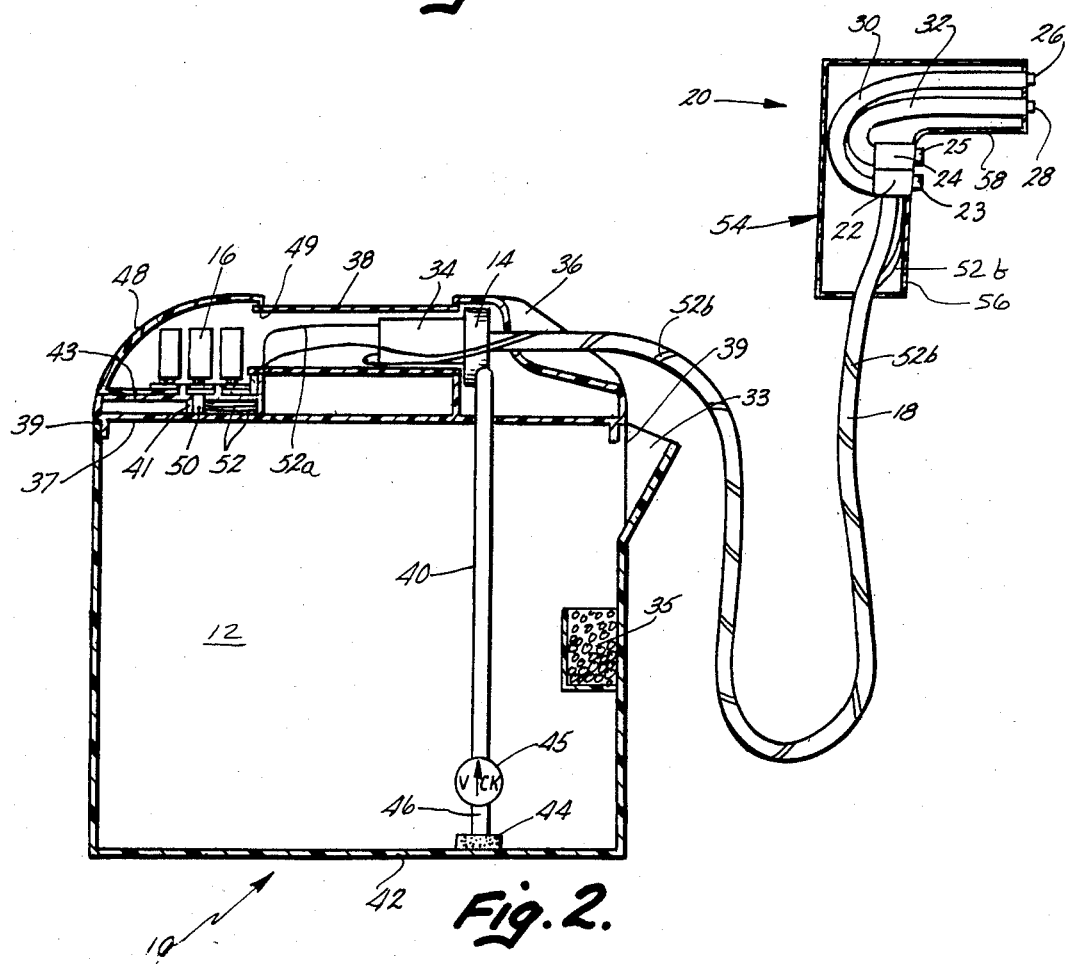
FIG. 2 is a sectional view of the device.

A plant watering/misting device in accordance with a preferred embodiment of the invention (FIGS. 1 and 2) comprises reservoir 12, cap 36 covering the reservoir, service gun 20, hose 18 interconnecting reservoir 12 and service gun 20, pump 14 for delivering liquid within reservoir 12 to service gun 20 through hose 18, motor 34 to drive the pump, and removable battery pack 16 for powering motor 34 of pump 14. Service gun 20 in turn includes two variable flow valves 22 and 24 fluidly connected to hose 18, a spraying nozzle 26, a stream nozzle 28, and tubing 30 and 32 interconnecting valves 22 and 24 and nozzles 26 and 28, respectively.

Turning more specifically to the construction of device 10, reservoir 12 is fabricated from plastic or any suitable, light-weight material. In the preferred embodiment, reservoir 12 has a capacity of approximately one and one-half gallons so that an adequate, but not burdensome, supply of water may be carried. Pouring spout 33 is integrally molded into reservoir 12 to provide a means wherethrough the reservoir may be filled and emptied. Pourous fertilizer dispenser 35 is mounted within reservoir 12 directly below spout 33 to optionally contain a water soluble fertilizer. To facilitate transportation of device 10, shoulder strap 37 is secured to reservoir 12 so that device 10 may be suspended from one's shoulder.

Cap 36 is mounted on top of reservoir 12 and includes a generally planar member 37 to cover reservoir 12 and an integral, hollow handle 38, which houses motor 34 and pump 14. Tabs 39 extend downwardly from member 37 to frictionally fit within reservoir 12. Preferably, cap 36 is also fabricated from a plastic, and more particularly the same material of which reservoir 12 is fabricated. Plug socket 41 is fixedly mounted between planar member 37 and battery platform 43 supported thereabove. Wires 52 electrically connect motor 34 and socket 41. Wire 52a extends directly between motor 34 and socket 41, while wire 52b also extends to triggers 23 and 25, which both include normally open switches (not shown) connected in parallel in wire 52b. Consequently, a connection in wire 52b between socket 41 and motor 34 is completed when either of triggers 23 and 25 is depressed closing its respective switch. Preferably wire 52b is wrapped around hose 18 between cap 36 and service gun 20.

Pump 14 and motor 34 are conventionally available and of a type well known to those having ordinary skill in the art, and consequently a detailed explanation of their construction and operation is unnecessary. Suffice it to say that motor 34 is preferably a 3.6 volt, DC motor which mechanically drives self-priming, centrifugal pump 14.

Down tube 40 extends from a position proximate bottom 42 of reservoir 12 to pump 14. Filter 44 and check valve 45 are mounted on lower end 46 of down tube 40.

Battery pack 16 is a 3.6 volt power source housed within battery housing 48, which is preferably fabricated of the same light-weight material as reservoir 12 and cap 36. Housing 48 also defines handle-receiving aperture 49. A plug 50 is electrically connected to battery pack 16 and extends into socket 41. Battery pack 16 may be recharged by removing housing 48 with battery pack 16 from device 10 and inserting plug 50 into a recharger.

Hose 18 is a flexible rubber or plastic hose which fluidly connects pump 14 and service gun 20. More particularly, hose 18 is in fluid communication with both of valves 22 and 24. In the preferred embodiment, hose 18 is approximately three feet long to provide the desired extendability of service gun 20 from cap 36.

Service gun, or dispensing device, 20 includes a housing 54 having a handle portion 56 in which are mounted valves 22 and 24 and a barrel portion 58, extending forwardly from handle portion 56, in which are mounted nozzles 26 and 28. Tubing 30 and 32 fluidly connect valves 22 and 24 and nozzles 26 and 28, respectively. Triggers 23 and 25 extend from valves 22 and 24, respectively, to actuate these variable flow valves and the switches (not shown) in wire 52b. Nozzle 26 is a spray nozzle, so that when liquid is forced therethrough, the liquid is sprayed or misted into relatively small droplets or particles. Nozzle 28 is a stream nozzle so that liquid forced therethrough forms a fluid stream. Preferably, service gun 20 is designed to be conveniently and comfortably held in one's hand and valves 22 and 24 are positioned to be actuated by the operator's fingers. Further, nozzles 26 and 28 are mounted within barrel portion 58 to be generally parallel to one another (FIG. 2) so that the liquid dispensed by the nozzles flows in generally parallel paths.

Operation

Plant watering/misting device 10 greatly facilitates the task of caring for house plants. Reservoir 12 is filled by either introducing water through spout 33 or by removing cap 36 and introducing water through the upper end of the reservoir. Water soluble fertilizer may be placed in dispenser 35 so that when liquid is introduced through spout 33 and when the level within reservoir 12 rises above dispenser 35, the fertilizer will dissolve into the water.

Next, cap 36, if removed, is mounted on reservoir 12 so that down tube 40, which extends downwardly from pump 14, is positioned within reservoir 12 with filter 44 proximate bottom 42 of the reservoir. Battery housing 48, containing battery pack 16, is mounted on cap 36 to provide power for motor 34. Whenever either of triggers 23 and 25 is depressed to complete a connection in wire 52b, motor 34 is powered to rotate and operate pump 14, drawing liquid through down tube 40 and forcing same into hose 18. Check valve 45 at lower end 46 of down tube 40 insures that liquid will not flow downwardly into the reservoir after pump 14 is primed.

Service gun 20 is held in the hand of the operator so that two of the operator's fingers are curled about triggers 23 and 25. When pump 14 is actuated, liquid is delivered under pressure through hose 18 to both of valves 22 and 24. Opening valve 22 permits liquid to flow from hose 18 through tubing 30 to spray nozzle 26. Similarly, opening valve 24 allows liquid to flow from hose 18 through tubing 32 to stream nozzle 28. Although usually only one of valves 22 and 24 will be opened, it is possible to open both of the valves simultaneously so that a spray and a stream are both produced. Because valves 22 and 24 are variable flow valves, the rate of flow through both valves is regulated by the extent to which the valves are depressed. When both of triggers 23 and 25 are released, the electrical connection in wire 52b is broken, stopping motor 34 and pump 14.

The device of the present invention provides a means whereby liquid may be easily and rapidly dispensed onto plants in both spray form and stream form using a single hand-held unit. Because two nozzles are provided, the operator need not make continual adjustments to the service gun to vary its output from spray to stream and back again. The operator need only press one of two valves conveniently located on the hand-held unit to selectively dispense liquid in either spray or stream form.

Alternative Embodiment

An alternative embodiment of the plant watering/misting device is shown in FIGS. 3 and 4 and generally designated 110. The design and operation of alternative device 110 is similar to that of device 10 previously described. The primary difference is that alternative device 110 is a wheeled unit having a relatively large reservoir 112, whereas device 10 is a shoulder-carried unit having a relatively small reservoir 12.

Basically, alternative device 110 includes reservoir 112, cap 136 to cover the reservoir, pump 114, battery 116, hose 118, and service gun 120, all of which cooperate as set forth with regard to device 10. Reservoir 112 has a relatively large capacity, which in the preferred embodiment is approximately 40 gallons. Alternative device 110 is supported on front casters 162, supported on pivotal frame assembly 163, and rear wheels 164. Handle assembly 155 extends from frame assembly 163. Cap 136 is mounted on reservoir 112 and houses battery 16, motor 134, and pump 114. Access doors 156 and 158 are hingedly mounted in the upper surface of cap 136 to provide access to battery 116 and pump 114, respectively. Battery 116 and motor 134 are electrically connected by wires 152.

Down tube 140 extends downwardly from pump 114 and includes filter 144 and check valve 145 at its lower end 146. Motor 134 drives pump 114 to draw liquid through down tube 140 and force the liquid into hose 118a. Hose 118b is coiled on spool 160, which is a spring-loaded retractable unit similar to that often found on conventional vacuum cleaners. A fitting (not shown) is provided, fluidly coupling hose 118a to hose 118b, yet allowing spool 160 to rotate.

Service gun 20' of device 110 is identical to service gun 20 and previously described and, accordingly, requires no further explanation. Suffice it to say that service gun 20' is fluidly connected to hose 118 to provide both spray and stream dispensing capabilities by selectively depressing valves 22' and 24'.

Motor 134 is driven by current from battery 116 to drive pump 114. When so operated, pump 114 draws liquid from reservoir 112 through down tube 140 and forces the liquid into tube 118, to be delivered to service gun 20' and, more particularly, valves 22' and 24'. The liquid may be dispensed in spray form or stream form as desired by pressing valve 22' or 24', respectively. Alternative device 110 may be transported by pulling the device by handle assembly 155.

It should be understood that the above description is intended to be that of preferred embodiments of the invention. Various changes and alterations may be made without departing from the spirit and broader aspects of the invention as set forth in the appended claims, which are to be interpreted in accordance with the principles of patent law including the doctrine of equivalents.

The embodiments of the invention in which an exclusive property or privilege is claimed are defined as follows:

1. A self-contained, portable plant watering/misting device comprising:
   a portable reservoir for containing a liquid to be dispensed onto plants;
   a pistol-shaped housing separate from said reservoir and adapted to be held in a human hand, said housing including a handle portion and a barrel portion extending from said handle portion;
   flexible fluid conduit connecting said reservoir with said housing;
   pumping means on said reservoir for conveying said liquid from said reservoir to said housing through said conduit;
   a battery housing removably mounted on said reservoir including rechargeable batteries located therein, said battery housing including first electrical quick disconnect connector means electrically connected to said batteries in said housing;
   mating quick disconnect connector means mounted on said reservoir and electrically connected to said pumping means whereby when said battery housing is mounted on said reservoir with said first and mating electrical quick disconnect means engaged, said batteries provide power to said pumping means which is mounted on said reservoir outside of said battery housing, and whereby when said battery housing is removed from said reservoir, it can be electrically connected to a charger for charging;
   first and second normally closed valves supported adjacent one another in said handle portion of said housing, said valves being independently actuable;
   spraying means supported in said barrel portion for dispensing said liquid in spray form, said spraying means being fluidly connected through said first valve to said flexible conduit, whereby when said first valve is opened, said liquid flows through said first valve and said spray means to be dispensed in spray form;
   stream means for dispensing said liquid in stream form, said stream means being fluidly connected through said second valve to said flexible conduit, whereby when said second valve is opened, said liquid flows through said second valve and said stream means to be dispensed in stream form;
   a fertilizer dispenser positioned on one wall of said reservoir and including an open top;
   said reservoir including a fill opening located on said one wall and spaced generally above said fertilizer dispenser whereby as one fills said reservoir with water through said fill opening, the water flows onto fertilizer located in said fertilizer dispenser and whereby fertilizer can be poured into said dispenser through said fill opening.

2. A device as defined in claim 1 wherein said portable reservoir includes means for suspending said reservoir from an individual's shoulder.

3. A device as defined in claim 2 wherein said spray and stream means are oriented to dispense said liquid in generally parallel paths.

* * * * *